United States Patent [19]

Carter

[11] Patent Number: 5,592,351
[45] Date of Patent: Jan. 7, 1997

[54] LOW PROFILE ENCLOSURE AND MECHANISM FOR A SINGLE CHANNEL HEAD 8MM TAPE DRIVE

[75] Inventor: David M. Carter, Simi Valley, Calif.

[73] Assignee: Tecmar Technologies, Inc., Longmont, Colo.

[21] Appl. No.: 376,122

[22] Filed: Jan. 18, 1995

Related U.S. Application Data

[63] Continuation of Ser. No. 60,251, May 12, 1993, abandoned.

[51] Int. Cl.⁶ ........................................................ G11B 5/55
[52] U.S. Cl. .................. 360/106; 360/122; 360/93; 360/129
[58] Field of Search ...................... 360/106, 109, 360/77.01, 75, 77.12, 77.13, 129, 93, 110, 125, 119, 122, 121

[56] References Cited

U.S. PATENT DOCUMENTS

| | | | |
|---|---|---|---|
| 3,914,793 | 10/1975 | Burnham | 360/109 X |
| 4,085,429 | 4/1978 | Hasegawa | 360/119 |
| 4,159,493 | 6/1979 | Ohta et al. | 360/125 X |
| 4,176,381 | 11/1979 | de Niet et al. | 360/77.12 |
| 4,318,147 | 3/1982 | Normura | 360/119 |
| 4,388,660 | 6/1983 | Osanai | 360/110 |
| 4,677,505 | 6/1987 | Nukada et al. | 360/77.12 |
| 4,780,778 | 10/1988 | Gunji et al. | 360/109 |
| 5,198,947 | 3/1993 | Nayak et al. | 360/109 |
| 5,270,529 | 12/1993 | Shudo | 360/77.12 X |
| 5,280,402 | 1/1994 | Anderson et al. | 360/106 |

*Primary Examiner*—Andrew L. Sniezek
*Attorney, Agent, or Firm*—Swanson & Bratschun, LLC

[57] ABSTRACT

A one inch high tape drive which can play a tape that is 0.315 inches (8 millimeters) wide. The tape drive includes a head that is defined by a first edge, a second edge and a centerline that is equal distance from each edge. The head is typically 0.64 inches high and includes a transducer which has a centerline that is offset from the centerline of the head by approximately 0.010 inches. The head is coupled to a stepper motor assembly which can move the head from the first edge of the tape to a location 0.010 inches from the second edge of the tape. The 0.010 offset allows a 0.315 inch (8 mm) wide tape to be played in a 1 inch high tape drive that has total tolerances of ±0.050 inches.

11 Claims, 3 Drawing Sheets

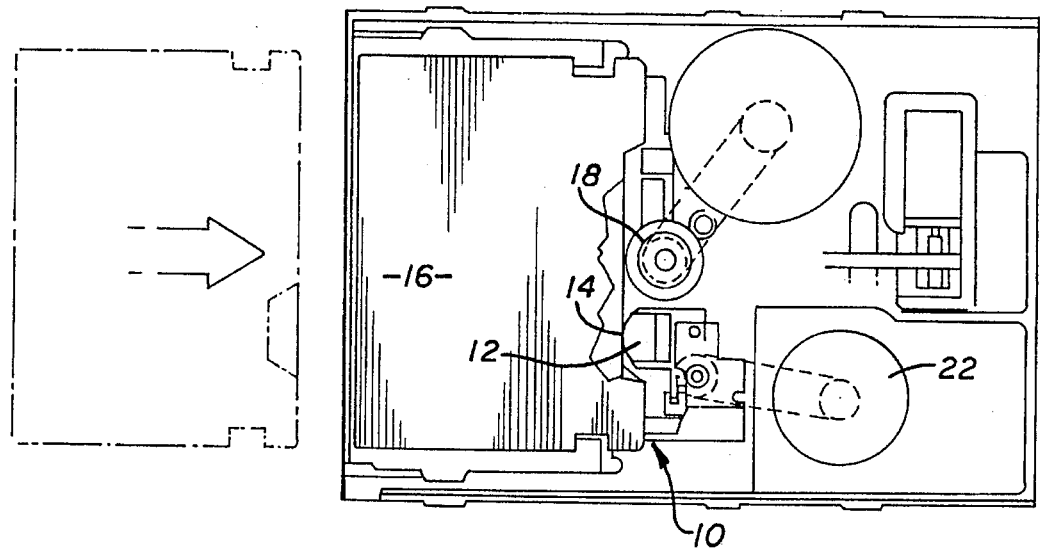
FIG. 1
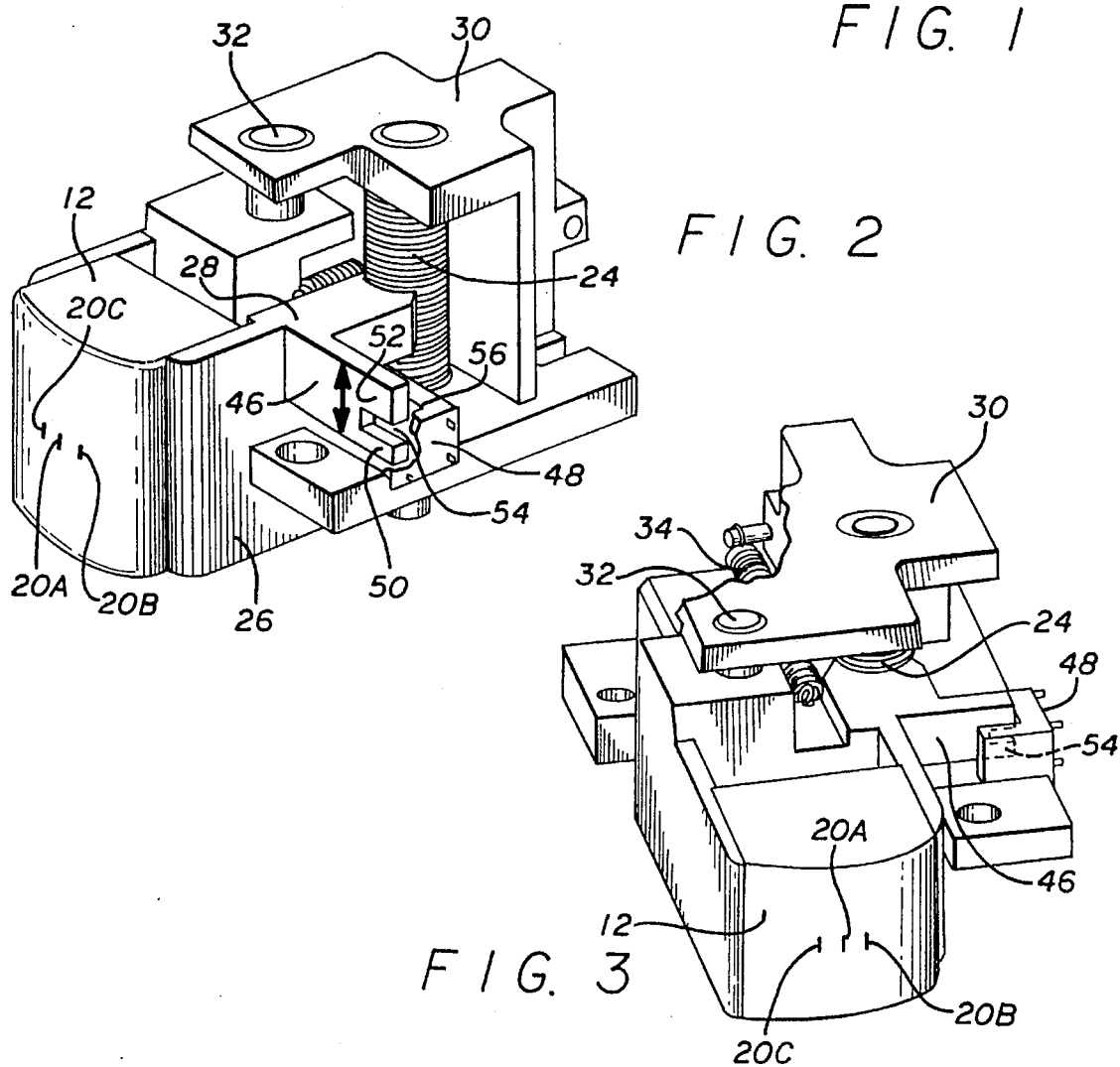
FIG. 2
FIG. 3

LOW PROFILE ENCLOSURE AND MECHANISM FOR A SINGLE CHANNEL HEAD 8MM TAPE DRIVE

This is a continuation of application Ser. No. 08/060,251 filed May 12, 1993 abandoned.

BACKGROUND OF THE INVENTION

1. Field of the Invention

The present invention relates to a cassette tape drive assembly.

2. Description of Related Art

Tape drive assemblies for cassette tapes contain a magnetic head which can write and read information by magnetizing and sensing the magnetic field of the tape. The information is typically stored in tracks that run parallel with the edges of the tape. The magnetic head is coupled to a stepper motor which can incrementally move the head from track to track. Information is read from the tape by moving the head to the appropriate track and sensing the magnetic field of the tape.

Cassette tapes are frequently used to store binary information from a computer and provide a backup storage device for the hard disk drive of the system. The advent of laptop computers has required backup tape systems to be both lightweight and small. Tape drive manufactures presently sell tape drive units that are 1 inch high (1 inch form factor). Commercially available one inch tape drives operate with tape that is 0.25 inches wide using a head that is approximately 0.52 inches high. To provide access to the full width of the magnetic tape the head must be capable of moving to the outer edges of the tape. The tape drive unit must therefore have enough space to allow the head to move the entire width of the tape. The tape drive must also have enough space to accommodate tolerances in the cassette tape and in the drive unit which houses the magnetic head. Conventional 1 inch drives must typically accommodate tape tolerances of ±0.030 inches. Additionally, the 1 inch high format has a tolerance of approximately ±0.020 inches, wherein the envelope for the drive unit may be as small as 0.98 inches.

There presently exist tape drives larger than 1 inch which utilize tape that is 0.315 inches (8 millimeters) wide with a head that is 0.64 inches high. Generally speaking, a 0.315 inch wide tape stores more information than a 0.25 inch tape. It would be desirable to provide a 0.315 inch tape in a one inch form factor using a conventional 0.64 inch high head with tolerances of ±0.050 inches (0.020 envelope tolerance +0.030 tape tolerance). Unfortunately the combination of a 0.64" head, a 0.315" tape and tolerances of ±0.050 (0.64+ 0.315+0.050=1.005) exceeds the 1 inch envelope of the one inch form factor.

SUMMARY OF THE INVENTION

The present invention is a one inch high tape drive which can play a tape that is 0.315 inches (8 millimeters) wide. The tape drive includes a head that is defined by a first edge, a second edge and a centerline that is equal distance from each edge. The head is typically 0.64 inches high and includes a transducer which has a centerline that is offset from the centerline of the head by approximately 0.010 inches. The head is coupled to a stepper motor assembly which can move the head from the first edge of the tape to a location 0.010 inches from the second edge of the tape. The unused area of the tape provides a guardband during reading and recording operations to compensate for movement between the tape and the head. The 0.010 inch offset allows a 0.315 inch (8 mm) wide tape to be played in a 1 inch high tape drive that has total tolerances of ±0.050 inches.

Therefore it is an object of the present invention to provide a one inch high tape drive which can read and write information on a tape that is 0.315 inches wide.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 shows a top cross-sectional view of a cassette tape cartridge inserted into a tape drive assembly;

FIG. 2 is a perspective view of a tape head assembly of the present invention;

FIG. 3 is an elevated view of the tape head assembly;

DETAILED DESCRIPTION OF THE INVENTION

Figure 4A:
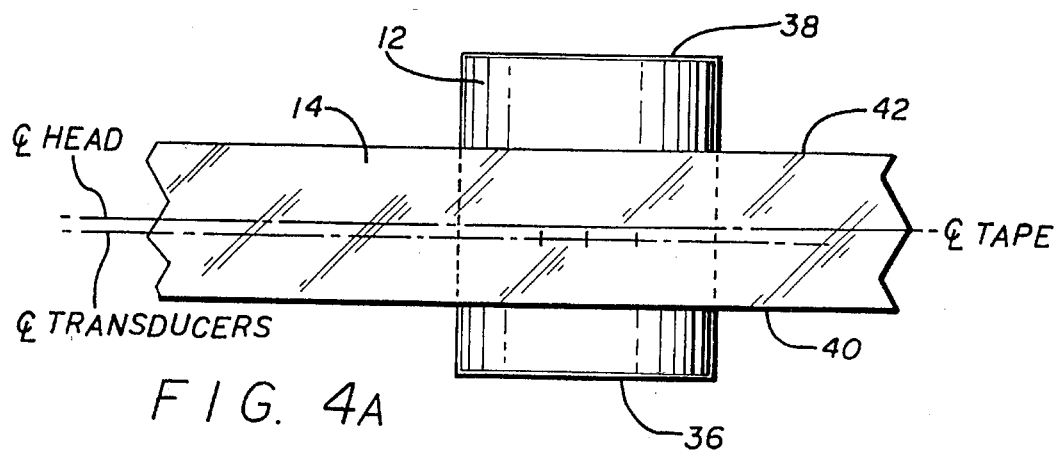
FIG. 4a is a side view showing the relative position the tape head and a tape.

Referring to the drawings more particularly by reference numbers, FIG. 1 shows a tape drive 10 that contains a tape head assembly 12 of the present invention. The assembly 12 includes a tape head 12 which has a transducer(s) that is adapted to magnetize and sense the magnetic field of a magnetic tape 14. The tape 14 is typically wound within a cartridge 16 that can be inserted and ejected from the drive unit 10. The tape 14 is moved across the tape head 12 by a capstan motor 18 as is known in the art.

As shown in FIGS. 2 and 3, the tape head 12 preferably has three separate transducers 20. The center transducer 20a is used to write information on the tape 14 in both the forward and reverse directions. The transducer 20b to the right of the center transducer reads the tape when moving in one direction, while the opposite outer transducer 20c reads the tape in the other direction. The outer transducers allow the tape head to read after write to compensate for any errors in the writing process.

Data is stored on the magnetic tape 12 in tracks that are located along the width of the tape. The transducers are located adjacent to a desired track by moving the head relative to the tape. The tape drive assembly contains a stepping motor 22 that rotates a lead screw 24 and moves the head 12. The head 12 is mounted to a head carriage 26 which has an arm 28 that is coupled to the lead screw 24. The arm 28 and lead screw 24 have matching threads so that rotation of the screw 24 induces a corresponding movement of the arm 28 and head 12 along the longitudinal axis of the lead screw 24.

The lead screw 24 is coupled to a bracket 30 which also supports the ends of a guide pin 32. The guide pin 32 extends through an aperture in the head carriage 26 and prevents relative rotational movement of the head 12 when the transducers 20 are being moved between the tracks of the tape 14. The head assembly 12 also contains a spring 34 that is attached to the bracket 30 and the carriage 26, and which biases the arm 28 into contact with the lead screw 24.

Figure 4B:
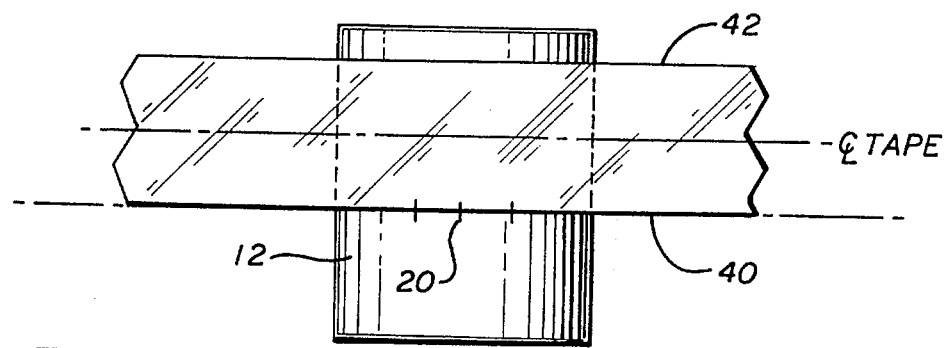
FIG. 4b is a view similar to FIG. 2a showing the head moved to the bottom of the tape.
Figure 4C:
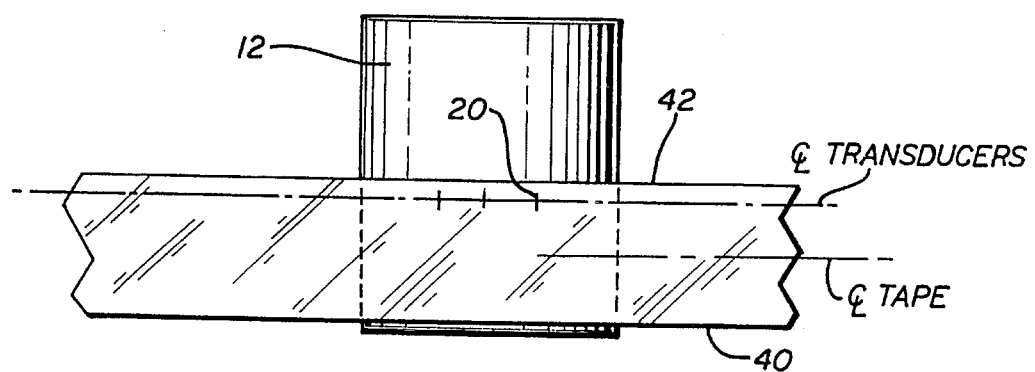
FIG. 4c is a view similar to FIG. 2a showing the head moved toward the top of the tape.

FIGS. 4a–c schematically show the relative position of the head 12 and the magnetic tape 14. The head 12 is generally defined by a first edge 36, a second edge 38 and a centerline located equal distance from the edges 36 and 38. The tape 14 is also defined by a pair of edges 40 and 42 and a centerline. The centerline of the transducers 20 is offset from the centerline of the head 12, so that when the edges of the tape head are concentric with the edges of the tape, the centerline of the transducers 20 is offset from the centerline of the tape 14.

The stepping motor 22 is capable of moving the centerline of the transducers from the first edge of the tape (see FIG. 4b), to a predetermined distance from the second edge (see FIG. 4c). The predetermined distance typically corresponds to the offset of the transducers from the centerline of the head 12. The portion of the tape that is not accessed by the centerline of the head is preferably a guardband which does not contain any data. Guardbands are commonly provided in the top portion of magnetic tapes to accommodate accumulative tolerance build-up at the outer edge of the tape.

Figure 5:
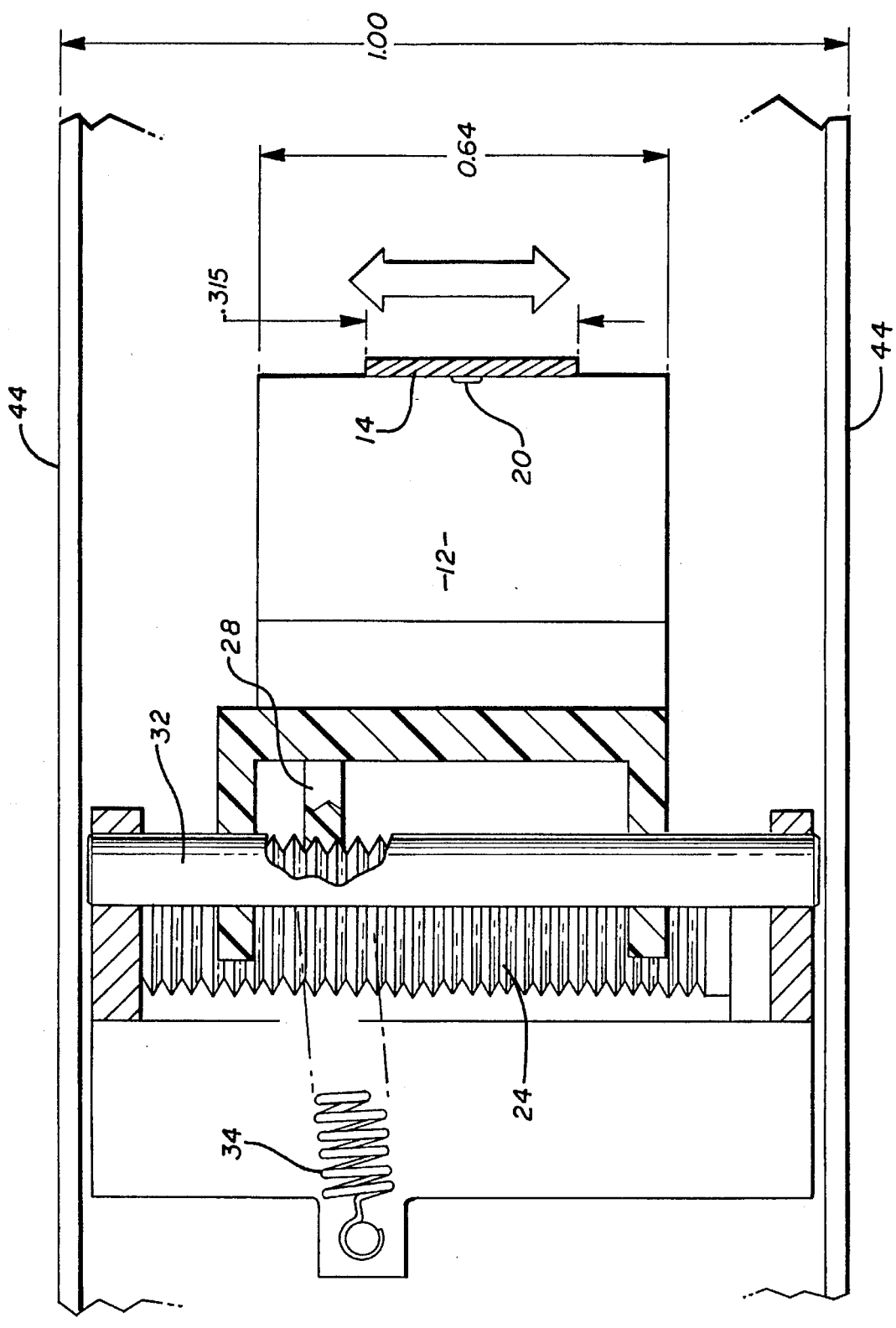
FIG. 5 is a cross-sectional side view of the tape drive of the present invention.

FIG. 5 shows a preferred embodiment of the tape assembly of the present invention. The assembly is mounted within a tape drive housing 44 that is 1.0 inch wide and has a tolerance of ±0.020 inches. The head is typically 0.64 inches tall, while the tape is preferably 0.315 inches (8 mm) wide. The tolerances of the head, tape and the location of the tape relative to the head is ±0.030 inches. The offset for such a tape drive is preferable set at 0.010 inches. The 0.010" offset allows the tape head to move along the entire data zone of the tape without interfering with the housing of the tape drive. What is thus provided is a tape assembly which allows a 8 mm wide tape to be played in a tape drive that has a 1" form factor.

As shown in FIG. 2, the head carriage 26 has a shutter plate 46 that is coupled to a photoelectric switch 48. The photoelectric switch 48 is connected to the electronics (not shown) of the tape drive assembly. The shutter plate 46 has a pair of opaque flags 50 and 52 separated by a notch 54. The flags 50 and 52 can interrupt an infrared beam of light that is directed across a gap 56 of the switch 48. In the preferred embodiment, the switch 48 generates a signal when the beam is not broken and does not provide a signal when the beam is interrupted by the shutter 46.

The shutter 46 is typically used to identify the location of the centerline of the tape 14 when the drive is initially assembled. After assembly, a precision tape is inserted into the drive and the stepper motor 22 moves the head 12 and shutter 46 until the light beam extends across the gap 56. The stepper motor 22 then moves the shutter 46 up until the light beam is broken. The stepper motor 22 continues to move the head up slightly past where the light beam is sensed by the sensor of the switch 48. The stepper motor 22 then moves the head 12 down until the shutter 46 again breaks the beam. Downward head movement continues until the beam traverses the gap 56 and is again broken by flag 52. The incremental movement of the head 12 between the last two illuminated points is stored in a volatile memory. The distance between the last two points corresponds to the combined width of the notch 54 and flag 50. The median distance between the two points is computed and the difference from the median to the magnetic tape centerline is burned into a read only memory (ROM) device of the tape drive system. The median distance corresponds to the centerline of the tape. The assembly may have to be calibrated so that the tape centerline correlates with the median location. The stored centerline location is then used for subsequent operation of the drive assembly. This arrangement eliminates the need for mechanical hard stops traditionally employed as secondary fiducial reference.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A tape drive assembly that can read and write information onto a magnetic recording tape, said recording tape having a selected width defined by a first tape edge and a second tape edge and a plurality of data tracks recorded between and substantially parallel to the edges of the tape, comprising:

an enclosure;

a tape head having a width defined by a first edge, a second edge and a centerline located equal distance from the first and second edges wherein the width of said tape head is at least twice the width of the recording tape, said tape head further having a transducer for reading and a transducer for writing data from one of said plurality of data tracks, said transducers having a common centerline offset from the centerline of the tape head; and positioning means for positioning said transducers from the first tape edge to a predetermined distance from the second tape edge, where the predetermined distance substantially equals the offset of the transducer centerline from the tape head centerline so that said transducers can read and write data from each of said plurality of data tracks.

2. The tape drive assembly as recited in claim 1, wherein said enclosure has a form factor with a height of less than four times the width of the tape.

3. The tape drive assembly as recited in claim 2, wherein said tape head has a height of about 0.64 inches and said enclosure has a height of about 1.0 inches.

4. The tape drive assembly as recited in claim 3, wherein said offset between said transducer centerline and said tape head centerline is approximately 0.010 inches.

5. The tape drive assembly as recited in claim 4 having dimensional and positioning tolerances of approximately ±0.050 inches.

6. A tape drive assembly, comprising:

a cassette tape cartridge having a length of recording tape, said tape having a width defined by a first edge and a second edge and a tape centerline equal distance from said tape edges, said tape having a plurality of tracks of data, wherein each of said tracks is recorded parallel to the centerline of said tape;

a single channel tape head having a width defined by a pair of outer edges wherein the width of said tape head is at least twice the width of said tape, a centerline located equal distance from said outer edges and a transducer having a write gap and at least one read gap positioned proximate to said write gap along a common centerline for recording and reading, respectively, data to each of said plurality of tracks; the common centerline offset by a selected distance from said tape centerline and said tape head centerline when said outer edges of said tape head are concentric with said edges of said tape; and, positioning means for positioning said transducer with respect to said tape from at least the first edge of said tape to within the selected distance from the second edge of said tape.

7. The tape drive assembly as recited in claim 6, wherein said transducer centerline is located at a position offset from a centerline of said tape head.

8. The tape drive assembly as recited in claim 6, wherein said tape is approximately 0.315 inches wide and said enclosure has a one inch form factor.

9. The tape drive assembly as recited in claim 8, wherein said tape head is approximately 0.64 inches high.

10. The tape drive assembly as recited in claim 9, wherein said offset is approximately 0.010 inches from said second edge of said tape.

11. The tape drive assembly as recited in claim 10, having cumulative tape and enclosure height dimensional tolerances of approximately ±0.050 inches.

* * * * *